US006481286B1

(12) United States Patent
Bernstein et al.

(10) Patent No.: US 6,481,286 B1
(45) Date of Patent: Nov. 19, 2002

(54) REENTRANT MICROWAVE RESONANT CAVITY ACCELEROMETER

(75) Inventors: Jonathan J. Bernstein, Medfield, MA (US); Anthony Petrovich, Tewksbury, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 24 days.

(21) Appl. No.: 09/650,783

(22) Filed: Aug. 30, 2000

(51) Int. Cl.$^7$ .............................................. G01P 15/08
(52) U.S. Cl. ................................. 73/514.31; 73/514.16
(58) Field of Search ...................... 73/514.16, 514.29, 73/514.31, 514.39; 324/635, 636; 333/219, 227, 228, 230, 231, 232, 233

(56) References Cited

U.S. PATENT DOCUMENTS

| | | | | |
|---|---|---|---|---|
| 4,891,982 A | * | 1/1990 | Norling | 73/514.29 |
| 5,292,569 A | | 3/1994 | Barry et al. | 428/66 |
| 5,351,541 A | | 10/1994 | Petrovich et al. | 73/517 R |
| 5,546,806 A | | 8/1996 | Kain | |
| 5,623,098 A | * | 4/1997 | Castleman et al. | 73/514.16 |
| 6,291,908 B1 | * | 9/2001 | Tran et al. | 73/514.24 |

OTHER PUBLICATIONS

Kumar, K., A. Petrovich, T. Lee, M. Watts and R. Dennis, High–Performance 18–GHz Microwave Readout Flexured Mass Accelerator, 55th Annual Meeeting of the Institute of Navigation, Cambridge, MA, Jun. 1999.

Petrovich, A., A. Kourepenis, M. Weinberg, The Developmemt of a Microwave Resonator Accelerometer, Proceedings of the Joint Services Data Echange Meeting, Palm Springs, CA, Nov. 1992.

* cited by examiner

*Primary Examiner*—Helen Kwok
(74) *Attorney, Agent, or Firm*—McDermott, Will & Emery

(57) ABSTRACT

An improved microwave resonant cavity accelerometer includes a reentrant microwave resonant cavity. Preferably, the accelerometer includes first and second complementary reentrant microwave resonant cavities, each being characterized by a nominal resonant frequency. Each cavity includes a capacitive gap, and an inductive gap surrounding each capacitive gap. A coupler couples to each cavity a microwave signal substantially at the nominal resonant frequency of each cavity. In response to an acceleration force along a sensing axis, a proof mass positioned along the sensing axis differentially changes the dimensions of each cavity and establishes a resonant frequency for each cavity which varies as a function of the acceleration force. The accelerometer includes means for detecting electromagnetic energy in each cavity and determining the frequency of the detected energy. The shift in resonant frequency is used to determine the acceleration of the proof mass. By usingreentrant cavities, the sensitivity of the accelerometer to an acceleration of the proof mass is improved by a factor of about 100 for miniaturized proof masses. The accelerometer may be fabricated using micromachining techniques.

19 Claims, 13 Drawing Sheets

| CHARACTERISTIC | SYMBOL | UNITS | VALUE |
|---|---|---|---|
| CAVITY INNER RADIUS | ra, (r1) | METERS | 5.00E-03 |
| CAVITY OUTER RADIUS | rb, (r2) | METERS | 1.00E-02 |
| CAVITY LENGTH | da, (h) | METERS | 1.00E-03 |
| CAVITY GAP | dgap, (x1,x2) | METERS | 3.00E-05 |
| CAVITY CAPACITANCE | Cc | FARAD | 2.32E-11 |
| CAVITY INDUCTANCE | Lc | HENRYS | 1.39E-10 |
| CAVITY RESONANT FREQUENCY | fo | Hz | 2.80E+09 |
| RF FIELD PENTETRATION DEPTH | delc | METERS | 1.21E-06 |
| CAVITY DISPLACEMENT SCALE FACTOR | sff | Hz / METER | 4.67E+13 |
| CAVITY Q (LOADED) | Qcav | | 340. |
| CAPACITOR SNAPDOWN VOLTAGE | | VOLTS | 352.8 |
| FRACTIONAL FREQUENCY FLUCTUATION (AMPLIFIER) | dfa | | 1.73E-09 |
| FRACTIONAL FREQUENCY FLUCTUATION (MIXER) | dfm | | 3.077E-10 |
| FLEXURE CHARACTERISTICS | | | |
| PROOF MASS | ma | Kg | 0.000183 |
| # OF FLEXURE LIGAMENTS | | | 4 |
| FLEXURE LIGAMENT WIDTH | w | METERS | 5.00E-04 |
| FLEXURE LIGAMENT THICKNESS | t | METERS | 8.00E-05 |
| FLEXURE LIGAMENT LENGTH | l | METERS | 2.50E-03 |
| FLEXURE STIFFNESS | kf | N/m | 10813. |
| DEFLECTION / g | sfd | METER / g | 1.658E-07 |
| MECHANICAL RESONANT FREQUENCY | fmo | | 1223.4 |
| g AT TOUCHDOWN | | | 180.9 |
| STRAIN AT TOUCHDOWN | | PPM | 1152 |
| SCALE FACTOR AND RESOLUTION | | | |
| SCALE FACTOR, FREQUENCY | sfhg | Hz / g | 7751983. |
| RESOLUTION, g IN 1 Hz BANDWIDTH | | g | 1.11E-07 |
| BIAS CHANGE / DEG C (APPROX) | | g / DEG C | 0.00045 |

FIG. 7

REENTRANT MICROWAVE RESONANT CAVITY ACCELEROMETER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention relates generally to accelerometers, and more particularly to high precision accelerometers constructed with microwave resonant cavities.

BACKGROUND OF THE INVENTION

High precision accelerometers are used for various commercial and military purposes, including aircraft navigation and missile guidance. One type of high precision accelerometer known in the art is the pendulous gyroscopic accelerometer, which is based on a rebalance mechanism. An unbalance is created, for example by adding a pendulous mass along a spin axis. An input acceleration creates a torque, which is counterbalanced by a torque in the opposite direction resulting from the rotation of the gyroscope about its input axis. The velocity of rotation of the gyroscope is used to determine the acceleration being sensed by the accelerometer. While the pendulous gyroscopic accelerometer can meet the performance standards required in strategic missile applications, it is an expensive and complex device, and has a large number of parts that require extensive precision machining and assembly time. The pendulous gyroscopic accelerometer is therefore not mass-producible as a small, inexpensive device adapted for commercial applications, and is incompatible with micromachining technologies.

U.S. Pat. No. 5,351,541 discloses a microwave resonator accelerometer which includes a structure defining a cylindrical microwave resonant cavity. The microwave resonant cavity is bounded at one end by a flexible member. The flexible member supports a proof mass so that the proof mass is moveable along a sensing axis. U.S. Pat. No. 5,292,569 discloses a flexible member for use in an accelerometer. An input acceleration force applied to the proof mass causes a displacement of the proof mass and the supporting flexible member along the sensing axis. The displacement of the flexible member changes the dimensions of the cavity, resulting in a change in the resonant frequency of the cavity. The shift in resonant frequency is used to determine the acceleration force applied to the proof mass. The microwave resonator accelerometer disclosed in U.S. Pat. No. 5,351,541 is simpler, more rugged and much less expensive than prior art pendulous gyroscopic accelerometers, while meeting a comparable standard of performance.

The acceleration-based variance in the resonant frequencies of the resonant cavities in U.S. Pat. No. 5,351,541 has, however, a low sensitivity to the displacement of the proof mass when applied to miniaturized proof masses, i.e. a frequency shift is not readily detectable for small displacements of miniaturized proof masses. Typically, miniaturized proof masses are less than 1 $cm^2$ in area.

Further, the microwave resonator accelerometer disclosed in U.S. Pat. No. 5,351,541 does not lend itself to miniaturization or micromachining in general, because of its cylindrical shape. Cylindrically shaped cavities have fairly large sizes at a given frequency of operation, typically about one half the wavelength of the microwave signal at the frequency of operation. If miniaturization of the cylindrical resonant cavity accelerometer is attempted, the resonant frequencies of the cavity become too high for reliable detection and processing, rendering such miniaturization impracticable with currently available electronic instrumentation.

It is therefore an object of the present invention to provide a microwave resonant cavity accelerometer that has a significantly improved sensitivity to an acceleration, as compared to prior art microwave resonant cavity accelerometers. It is another object of the present invention to provide a microwave resonant cavity accelerometer that can be fabricated using micromachining processes.

SUMMARY OF THE INVENTION

The present invention features an improved microwave resonant cavity accelerometer that achieves an improvement in sensitivity by a factor of about 100 over the prior art when applied to miniaturized proof masses that typically are less than 1 $cm^2$ in area. In overview, the accelerometer includes (i) a reentrant microwave resonant cavity characterized by a nominal resonant frequency and bounded in part by a proof mass positioned along a sensing axis, (ii) a coupler for coupling an electromagnetic signal into the cavity substantially at the nominal resonant frequency of the cavity, and (iii) means for detecting electromagnetic energy in the cavity and determining a frequency of the detected energy. A displacement of the proof mass along the sensing axis in response to an acceleration force changes the dimensions of the cavity so as to establish a resonant frequency for the cavity that varies as a function of the acceleration force. The shift in resonant frequency provides a measure of the acceleration.

A microwave resonant cavity constructed according to the present invention includes a rigid body member, a rigid end member, and a flexible end member. The rigid body member is open-ended and hollow, and is disposed about a central void region. The body member extends along a sensing axis from a first end to a second end, and includes an electrically conductive inner wall that bounds in part the void region. The rigid end member extends transverse to the sensing axis, and extends from the body member across the void region at the first end. The rigid end member includes an electrically conductive rigid wall that bounds in part the void region. The flexible end member extends transverse to the sensing axis, and extends from the body member across the void region at the second end. The flexible member includes an electrically conductive flexible wall that bounds in part the void region.

A proof mass is positioned along the sensing axis, and is supported by the flexible wall. The proof mass has an electrically conductive outer surface that bounds in part the void region. The outer surface of the proof mass extends from the flexible wall toward the rigid wall. A distal portion of the outer surface of the proof mass establishes a capacitive gap between the outer surface and the rigid wall. The capacitive gap is relatively narrow in the direction of the sensing axis. An annular region of the flexible wall between the proof mass and the body member establishes an inductive gap between the annular region and the rigid wall. The inductive gap is relatively large in the direction of the sensing axis.

The central void region bounded by the outer surface of the proof mass, the annular region of the flexible wall, and by the walls of the body member and the rigid end member forms a reentrant type resonant cavity that is characterized by a resonant microwave frequency.

An accelerometer constructed according to the present invention includes a reentrant type resonant cavity as described above. In a preferred embodiment, the accelerometer is a dual-cavity accelerometer that includes first and second complementary reentrant microwave cavities, each characterized by a nominal resonant frequency. A hollow, rigid cavity housing encloses a central void region. The cavity housing includes a plurality of electrically conductive inner walls bounding the central void region. A flexible, nominally planar member extends from an inner wall of the housing across the void region to an opposite inner wall. A proof mass is positioned along a sensing axis, and is disposed on and supported by the flexible member, so that the proof mass and the flexible member divide the central void region into a first void region extending from a first side of the flexible member and a second void region extending from a second side of the flexible member. An outer surface of the proof mass bounds in part the first and second void regions.

First and second portions of the outer surface of the proof mass establish first and second capacitive gaps between each portion and an electrically conductive inner wall that is disposed adjacent to and across from the portion. The capacitive gaps are relatively narrow in a direction of the sensing axis. An annular inductive gap surrounds each capacitive gap. The inductive gaps are relatively wide in the direction of the sensing axis.

The first and second void regions form first and second complementary reentrant microwave resonant cavities, each cavity being characterized by a nominal resonant microwave frequency. Preferably, the first and second reentrant microwave resonant cavities are tuned to the same nominal resonant frequency. In one embodiment, the nominal resonant frequencies of the first and second reentrant cavities are less than about 3 GHz.

One or more couplers couples an electromagnetic signal into each cavity, substantially at the nominal resonant frequency of the cavity. In one embodiment, the couplers include coaxial leads. Upon coupling of the electromagnetic signal into the cavity, the electric field within the cavity is substantially concentrated within the narrow capacitive gap, whereas the magnetic field within the cavity is substantially concentrated within the relatively wide inductive gap.

In response to an acceleration force along the sensing axis, the proof mass differentially changes the dimensions of each cavity, and establishes a resonant frequency for each resonant cavity which varies as a function of the acceleration force. The shift in resonant frequency is measured to determine the acceleration of the proof mass.

The accelerometer includes means for detecting electromagnetic energy in each cavity, and for determining the frequency of the detected energy. The means for determining the frequency of the detected energy includes means for discriminating, in response to a reflected microwave signal from the cavity, a frequency shift in the resonant frequency of each cavity.

In one embodiment, the means for determining the frequency of the detected energy includes a phase locked loop circuit. The phase locked loop circuit may include a signal source that generates an input microwave signal substantially at the nominal resonant frequency of the cavity. Preferably, the signal source is a voltage-controlled signal source whose frequency may be adjusted. The phase locked loop circuit may also include a phase discriminant circuit that discriminates a phase shift between the input microwave signal and a microwave signal reflected from the resonant cavity, and generates an indicator signal representative of the phase shift. The phase locked loop circuit may also include a feedback circuit that feeds the indicator signal back to the signal source. Upon feedback of the indicator signal, the signal source generates an output signal that varies in frequency according to the displacement of the proof mass induced by the acceleration force. The means for determining the frequency of the detected energy may also include a frequency counter that counts a frequency of the frequency varying output signal, and generates digital signals representative of the acceleration of the proof mass.

The accelerometer of the present invention may be fabricated using micromachining techniques. In one embodiment of the present invention, a micromachined accelerometer includes a miniaturized proof mass having a surface area less than about 1 cm$^2$. In one embodiment, an inner radius of each cavity is less than about 0.50 cm, and an outer radius of each cavity is less than about 1.0 cm. In one embodiment, a micromachined accelerometer constructed according to the present invention is monolithic, namely the proof mass, the rebalance electrodes, and springs are etched upon a single substrate. In one embodiment, the monolithic accelerometer has an in-plane structure, namely the motion of the proof mass has a displacement vector parallel to a planar surface of the substrate.

In one embodiment, the resolution of the accelerometer of the present invention is about $1.1 \times 10^{-7}$ g, in 1 Hz bandwidth. The sensitivity of the accelerometer is about $1.3 \times 10^{-7}$ g/Hz. An improvement in sensitivity by a factor of about 100 is thereby achieved over the prior art, for miniaturized proof masses.

The present invention also features a method for measuring an acceleration induced by an acceleration force acting on a proof mass. The method includes the step of providing a reentrant microwave resonant cavity having a capacitive narrow gap and an inductive wide gap surrounding the capacitive gap, and having a nominal resonant frequency. The method further includes the step of coupling a microwave signal into the reentrant resonant cavity substantially at the nominal resonant frequency. The method further includes the step of inducing, in response to the acceleration force, a displacement of a proof mass that changes the dimensions of the reentrant resonant cavity. The method further includes establishing a resonant frequency of the reentrant resonant cavity which varies as a function of the acceleration force. The method further includes measuring a frequency shift in the resonant frequency to determine the acceleration of the proof mass.

BRIEF DESCRIPTION OF THE DRAWINGS

FIG. 7 is a table of typical device characteristics for one embodiment of an accelerometer constructed according to the present invention.

DETAILED DESCRIPTION

Figure 1:
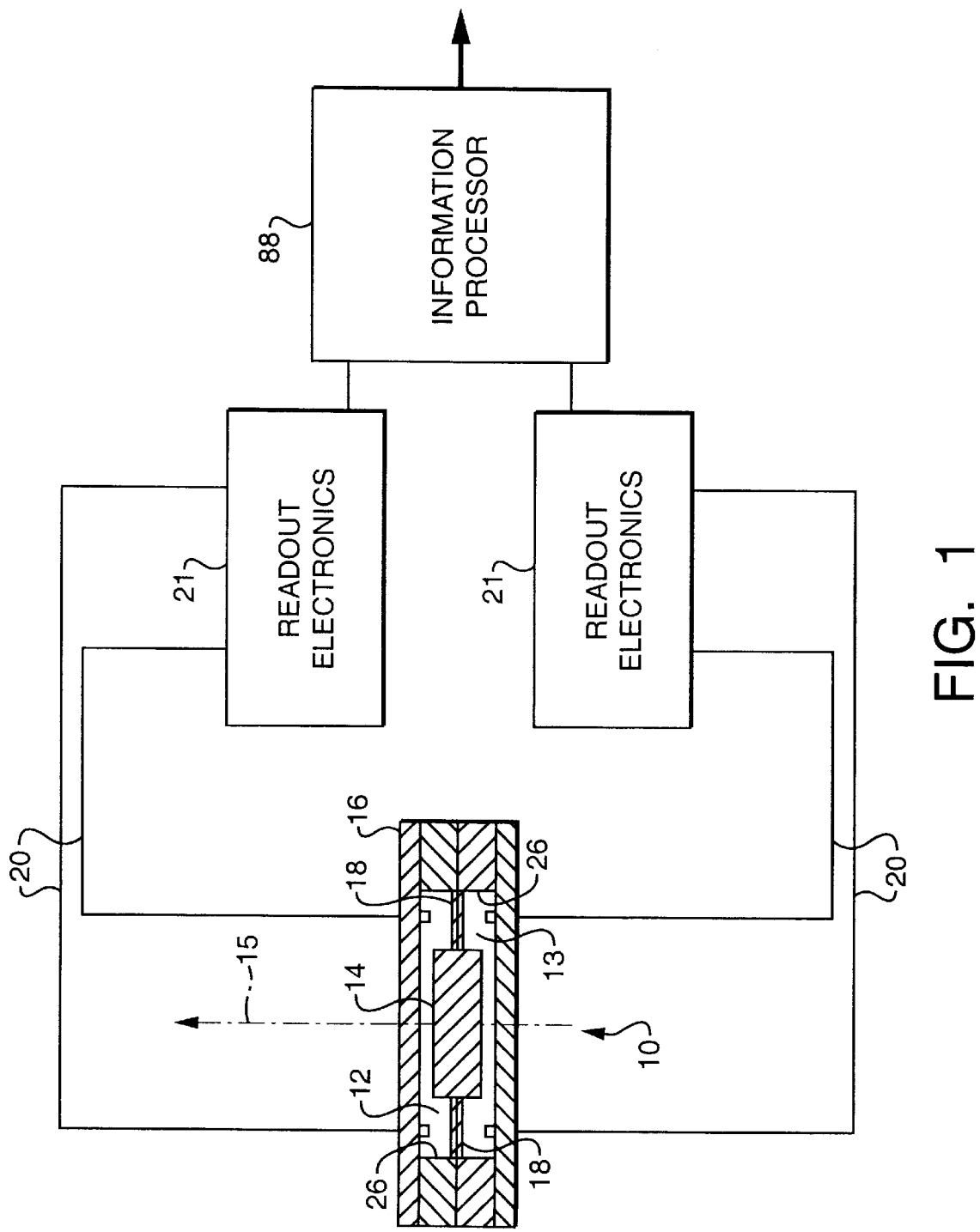
FIG. 1 is a schematic representation of an accelerometer constructed according to the present invention.

FIG. 1 shows a schematic representation of a microwave resonant cavity accelerometer 10 constructed according to the present invention. In overview, the microwave resonant cavity accelerometer 10 comprises a microwave resonant cavity 12 characterized by a nominal resonant frequency. In the illustrated preferred embodiment, the accelerometer 10 is a dual-cavity accelerometer, having first 12 and second 13 complementary resonant cavities within a cavity housing 16. A proof mass 14 is positioned along a sensing axis 15, and is supported by a flexible member 18 extending between an inner wall 26 of the cavity housing 16 and an opposite inner wall 26. Couplers 20 couple a microwave signal, typically in the gigahertz range, into the cavities substantially at the nominal resonant frequency of each cavity. The microwave signal is applied to the cavities through one coupler 20 and exits through a second coupler 20. In response to an acceleration force on the proof mass 14 in the direction of a sensing axis 15, the proof mass 14 differentially changes the dimensions of each cavity and thereby establishes a resonant frequency for each cavity which varies as a function of the acceleration force.

Each cavity is coupled through couplers 20 to a means 21 for detecting electromagnetic energy in each cavity and determining the frequency of the detected energy. The means for detecting electromagnetic energy may include readout electronic circuits 21, which generate signals that vary in frequency according to the displacement of the proof mass 14 in response to the acceleration force along the sensing axis 15. The signals may be digitized and sent to an information processor 88.

To improve the sensitivity of the accelerator to the motion of the proof mass 14, an accelerometer 10 according to the present invention includes resonant cavities 12 and 13 that are reentrant type resonant cavities, in contrast to prior art microwave resonant cavity accelerometers which use resonant cavities having a simple cylindrical shape. As discussed in the background section of the present application, accelerometers using simple cylindrical cavities exhibit a poor sensitivity to the displacement of a miniaturized proof mass. The use of reentrant resonant cavities 12 and 13 greatly improves the sensitivity of the resonant frequencies to the displacement of the proof mass, typically increasing the resolution of the accelerometer by a factor of 100 for miniaturized proof masses.

The efficiency and resolution of the accelerometer 10 is determined by the sensitivity of the resonant frequencies of the cavities 12 and 13 to the displacement of the proof mass 14 in response to the acceleration force. The proportional change in resonant frequency in response to a small change in volume (induced by a motion of the proof mass 14 in response to the acceleration force) of the cavity is given by:

$$\frac{\Delta\omega}{\omega} = \frac{\int_{\Delta V}(\mu H^2 - \epsilon E^2)dV}{\int_{V}(\mu H^2 + \epsilon E^2)dV} = \frac{\int_{\Delta V}(\mu H^2 - \epsilon E^2)dV}{4U} \quad (1)$$

where
- $\omega$=resonant frequency of the cavity;
- H=magnetic field in the cavity;
- E=electric field in the cavity;
- V=volume of the cavity;
- $\epsilon$=dielectric constant;
- $\mu$=magnetic permeability; and
- U=total electromagnetic energy within the cavity at any given time.

In order to induce a large change in resonant frequency from a small change in cavity volume (induced by a small displacement of the proof mass), and thereby increase the resolution and sensitivity of the accelerometer, the magnitude of equation (1) must be maximized. From equation (1), it is seen that in order to maximize $\Delta\omega/\omega$, the motion of the proof mass must sweep out a volume within which either the electric field or the magnetic field, but not both, is very large. Equation (1) shows that the change in resonant frequency is negligible if the proof mass 14 sweeps out a volume in which the electric and magnetic energy densities are comparable, and that there is no change in resonant frequency when the proof mass 14 sweeps out a volume in which the electric and magnetic energy densities are equal.

As well known in the art, a reentrant resonant cavity provides separate regions within the cavity in which either the electric field or the magnetic field, but not both, is very large. In a reentrant resonant cavity, one or more sections of the conducting enclosure are directed inward, thereby confining the electric and magnetic fields within the cavity to well-defined regions. Typically a protruding portion is provided within a resonant cavity that is formed by an inner conductor whose height is a little shorter than the height of an outer conductor. The distribution of electric field density of the microwave energy coupled into a reentrant cavity is greatly increased at the vicinity of the protruding portion. Reentrant resonant cavities typically contain a narrow gap which is highly capacitive, and a surrounding wide gap which is highly inductive. Upon coupling of electromagnetic energy into a reentrant cavity, the electric field within the cavity is substantially concentrated in the narrow gap capacitive region, while the magnetic field within the cavity is substantially concentrated in the wide gap inductive region.

Figure 2:
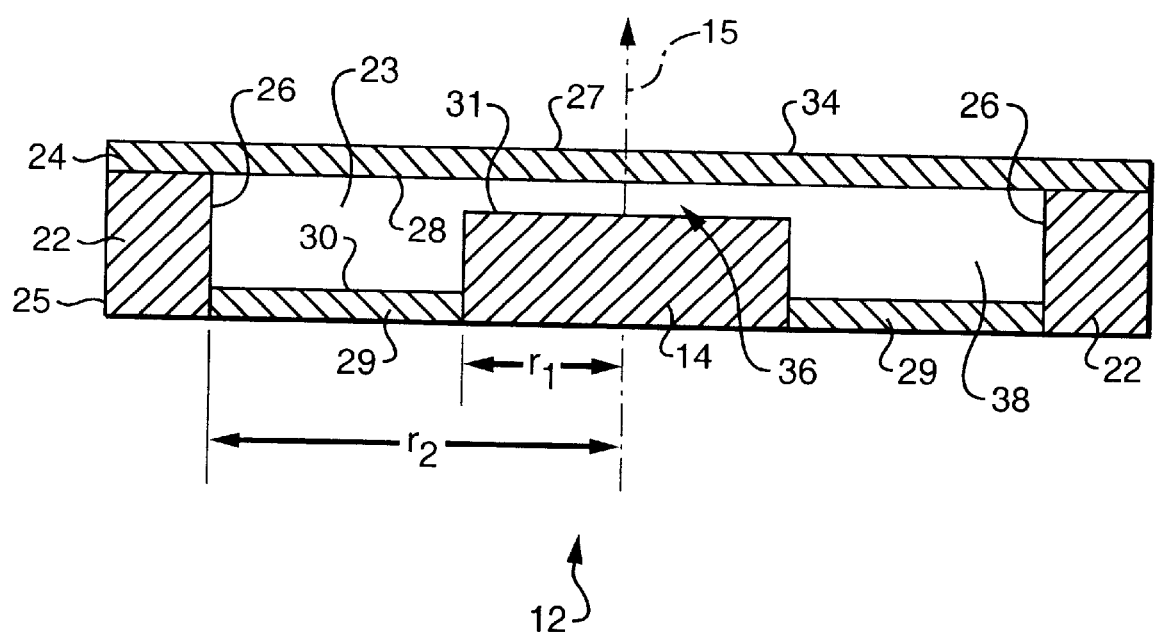
FIG. 2 is a cross-sectional view of a reentrant microwave resonant cavity constructed according to the present invention.

FIG. 2 is a cross-sectional view of a cylindrically symmetric reentrant resonant cavity 12, constructed according to the present invention. An open-ended, hollow, rigid body member 22 is disposed about a central void region 23. The body member 22 extends along a sensing axis 15 from a first end 24 to a second end 25. The body member 22 includes an electrically conductive inner wall 26 that bounds in part the void region 23. A rigid end member 27 extends transverse to the sensing axis 15 and from the body member 22 across the void region 23 at the first end 24. The end member 27 includes an electrically conductive rigid wall 28 that bounds in part the void region 23. A flexible end member 29 extends transverse to the sensing axis 15, and extends from the body member 22 at the second end 25 across the void region 23. The flexible end member 29 includes an electrically conductive flexible wall 30 that bounds in part the void region 23.

A proof mass 14 is positioned along the sensing axis 15 and is supported by the flexible wall 30 so as to allow a displacement of the proof mass 14 along the sensing axis 15. The proof mass 14 can be either solid or hollow. The proof mass 14 has an electrically conductive outer surface 31 that bounds in part the void region 23. The outer surface 31 of the proof mass 14 extends from the flexible wall 30 toward the rigid wall 28, whereby a distal portion of the outer surface 31 establishes a gap 36 that is relatively narrow in the direction of the sensing axis 15, between the outer surface 31 and the rigid wall 28. An annular region of the flexible wall 30 between the proof mass 14 and the body member 22 establishes a gap 38 that is relatively wide in the direction of the sensing axis 15, between the annular region and the rigid wall 28.

The void, region 23 forms a reentrant resonant cavity 12, characterized by a resonant microwave frequency. The resonance frequency of the reentrant resonant cavity 12 can be adjusted by varying the dimensions of the cavity, such as the height of the narrow gap 36.

As known in the art, the narrow gap 36 formed between the outer surface 31 of the proof mass 14 and the rigid wall 28 is highly capacitive, allowing for very large electric field strengths to be achieved across the gap 36 when electromagnetic energy is coupled into the cavity through a coupler. A high frequency electric field is concentrated within the narrow gap 36 and is approximately uniform, so that most of the capacitance which determines the resonant frequency of the resonant cavity 12 is that of the narrow gap 36. The annular wide gap 38 is highly inductive, so that the magnetic field within the cavity is concentrated in the annular wide gap 38 when electromagnetic energy is coupled into the cavity. In the illustrated embodiment, the annular wide gap has radial dimensions between $r_2$ and $r_1$. The annular wide gap 38 surrounds the capacitive narrow gap 36, forming an inductive loop around the capacitive gap 36.

Figure 3A:
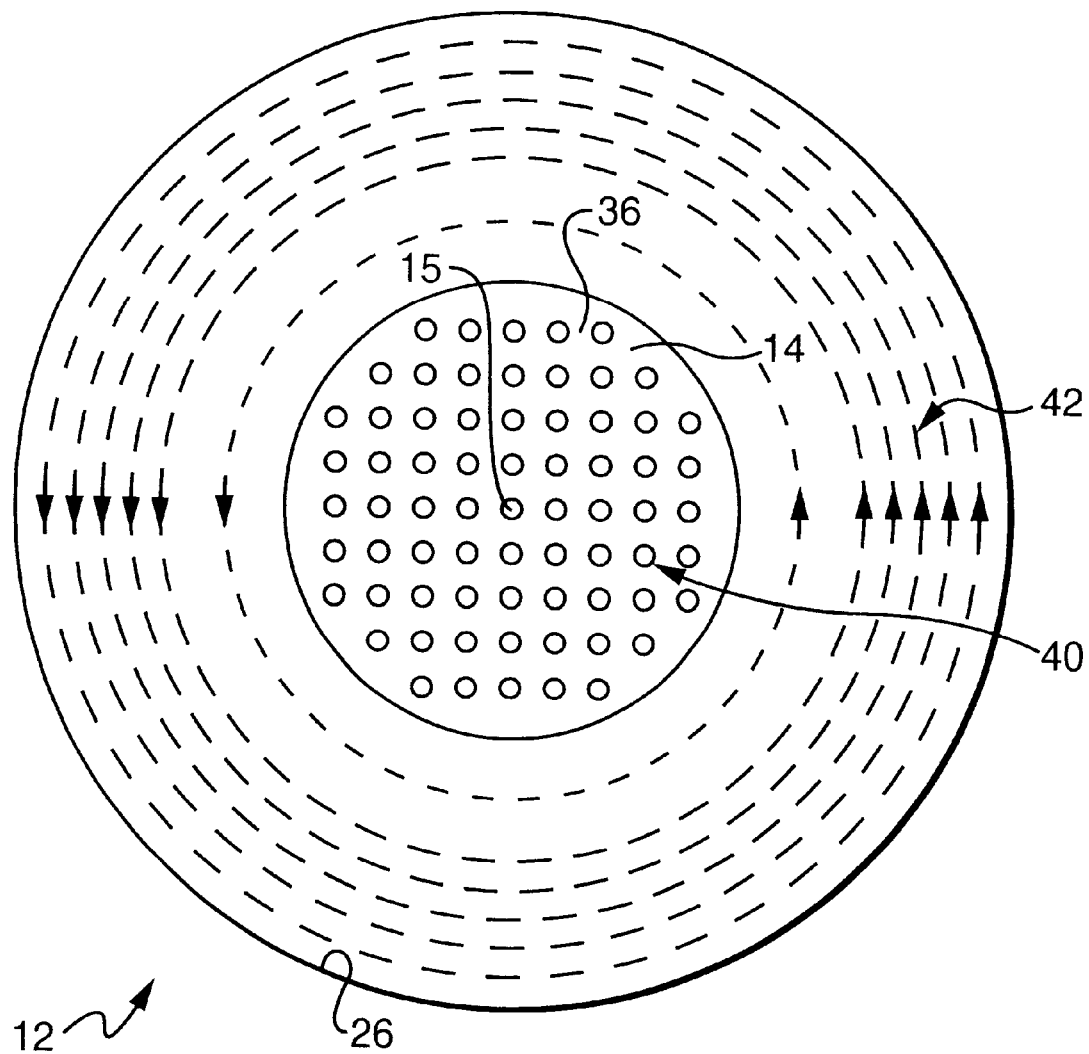
FIG. 3(a) is a plan view of a cylindrically symmetric reentrant microwave resonant cavity, showing the electric and magnetic field lines formed in the cavity.

FIG. 3(a) is a plan view of a cylindrically symmetric reentrant microwave resonant cavity 12, showing the electric 40 and magnetic 42 field lines that form in the cavity when electromagnetic energy is coupled into the cavity. As seen from FIG. 3(a), the magnetic field is perpendicular everywhere to a plane passing through the sensing axis 15, while the electric field lies in the plane and is directed parallel to the axis 15. Lines of magnetic flux form circles about the axis 15, while lines of electric flux are directed from the outer surface of the proof mass toward an opposite rigid wall (not showing) in FIG. 3(a). The electric field outside the narrow gap 36 is negligible compared to the electric field within the narrow gap 36, and tends to become zero at the inner wall 26 of the body member situated away from the narrow gap 36. The magnetic field is zero at the center of the narrow gap 36, and increases from its value at the edge of the narrow gap 36 and reaches its maximum value at the inner wall 26, as shown by the field lines in FIG. 3(a).

Figure 3B:
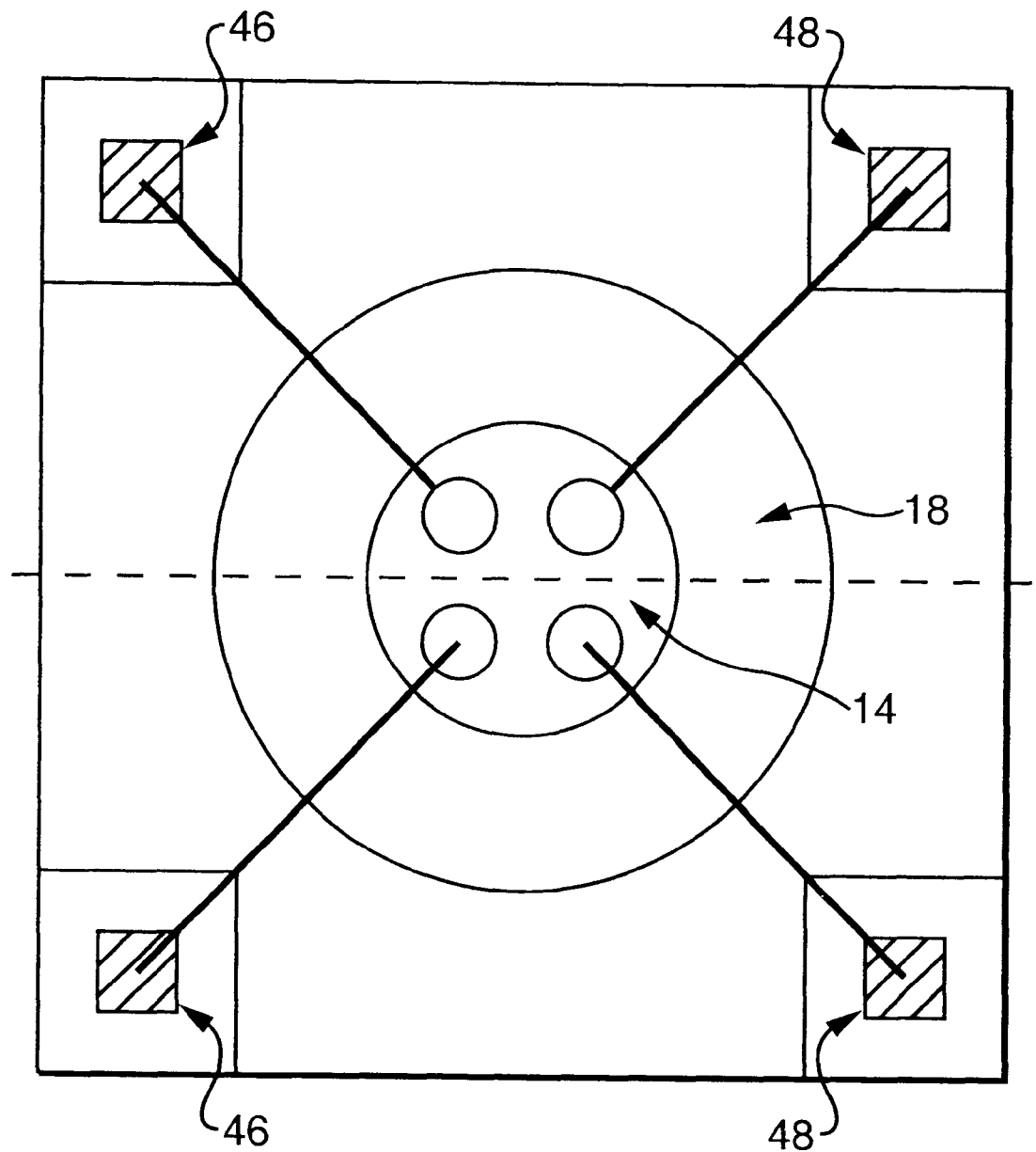
FIG. 3(b) is a plan view of a dual-cavity reentrant microwave resonant cavity accelerometer constructed according to the present invention.

FIG. 3(b) is a plan view of an accelerometer constructed according to the present invention. In the embodiment shown in FIG. 3(b), the flexible element 18, as well as the proof mass 14 and the reentrant resonant cavity, have a circular cross-section. Driving 46 and sensing 48 electrodes are shown to be coupled to the proof mass 14. The driving electrodes 46 drive the electromagnetic resonances in the reentrant microwave cavities. The sensing electrodes 48 sense the frequencies of the signals reflected from the proof mass 14, i.e. sense the new resonant frequencies of a reentrant cavity after a motion of the proof mass 14 that changes the configuration of the reentrant cavity.

Figure 4:
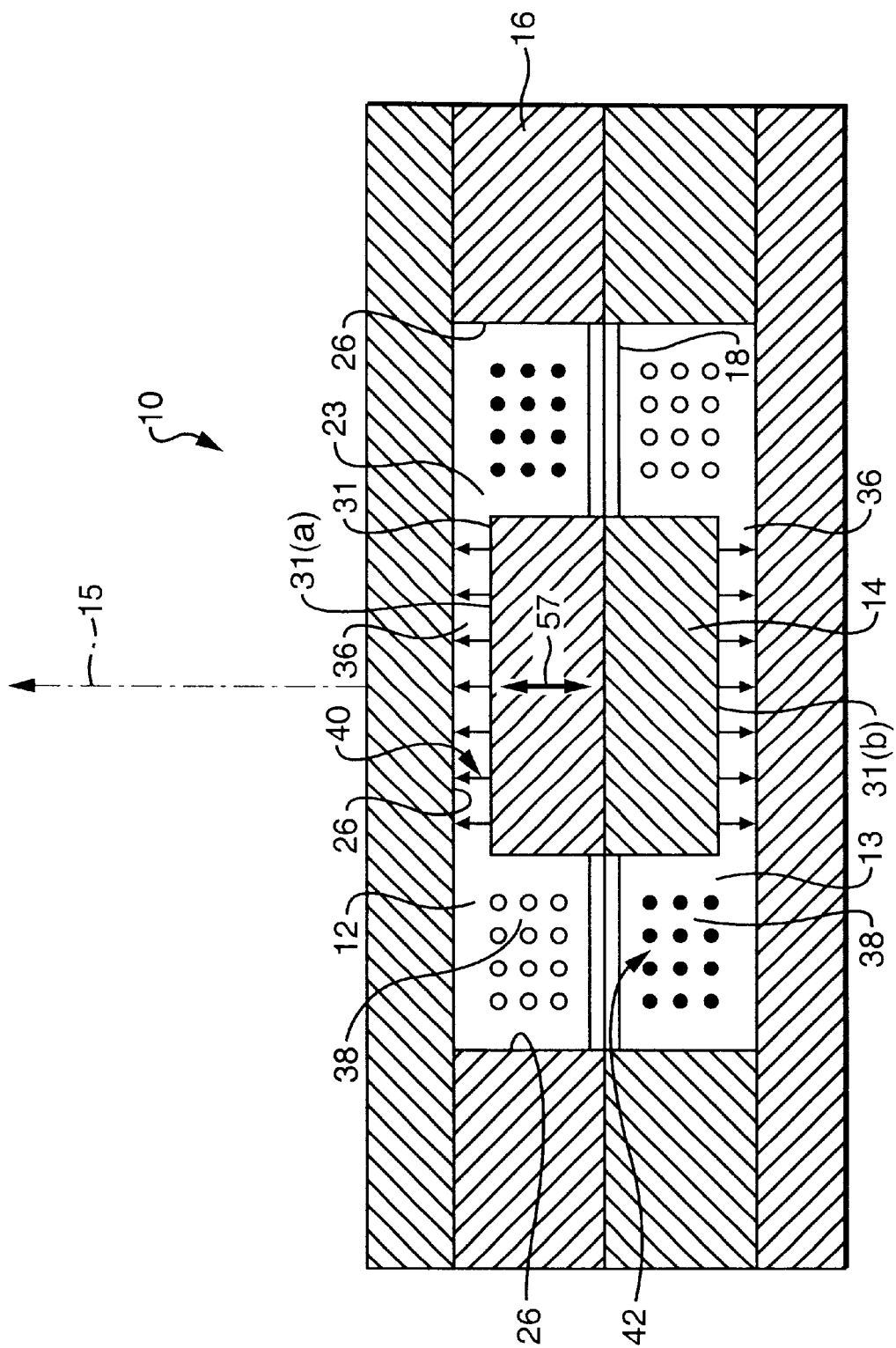
FIG. 4 is a cross-sectional view of a dual-cavity accelerometer that includes first and second complementary reentrant microwave resonant cavities.

FIG. 4 presents a cross-sectional view of a preferred embodiment of the present invention, namely a dual-cavity accelerometer 10 that includes first 12 and second 13 complementary resonant cavities. Also shown are the electric 40 and magnetic 42 field lines. A hollow, rigid cavity housing 16 encloses a central void region 23. The cavity housing 16 includes a plurality of electrically conductive inner walls 26 bounding the central void region 23. A flexible, nominally planar member 18 extends from an inner wall 26 of the cavity housing 16 across the void region 23 to an opposite inner wall 26. A proof mass 14 is positioned along a sensing axis 15, and is disposed on and supported by the flexible member 18. The proof mass 14 and the flexible member 18 divide the central void region 23 into a first void region extending from a first side of the flexible member 18, and a second void region extending from a second side of the flexible member 18. An outer surface 31 of the proof mass 14 bounds in part the first and second void regions.

Portions 31(a) and 31(b) of the outer surface 31 of the proof mass 14 establishes capacitive gaps 36 between each portion and the inner wall 26 disposed adjacent to and across from the portion. The capacitive gaps 36 are relatively narrow in the direction of the sensing axis 15. An annular inductive gap 38 surrounds each capacitive gap. The inductive gaps are relatively wide in the direction of the sensing axis.

The first and second void regions form first 12 and second 13 complementary reentrant microwave resonant cavities, each characterized by a resonant microwave frequency. Each of the first 12 and second 13 reentrant cavities are complementarily bounded by the outer surface 31 of the proof mass 14, so that the proof mass 14 forms a reentrant section for each resonant cavity.

In operation, a microwave signal having a value approximately equal to the nominal resonant frequency of the cavities 12 and 13, which preferably are tuned to the same nominal resonant frequency, is coupled to the cavities. An acceleration force in either direction, as indicated by arrows 57, causes a movement of the proof mass 14, which changes the resonant frequencies of the cavities to somewhat above or below the initial nominal resonant frequency. The proof mass 14 sweeps out a volume entirely within a region that contains a large E field, but a negligible H field. For a given motion of the proof mass 14, the shift in resonant frequency of each reentrant cavity is therefore maximized, as demonstrated earlier in connection with equation (1).

In the dual-cavity accelerometer shown in FIG. 4, the geometry of the two cavities is complementarily affected by the motion of the proof mass 14. Accordingly, one cavity has its resonant frequency increased, while the other cavity has its resonant frequency decreased. The differential arrangement of the two cavities allows for common mode error subtraction. The common mode error terms caused by thermal shifts, cross axis inputs, or residual stress can be compensated by the differential arrangement of the dual-cavity accelerometer. The reflected signals having the new resonant frequency is coupled back out of the cavities 12 and 13. The sensing electrodes 48 sense the two different frequencies of the reflected signals, one higher and one lower than the original nominal resonant frequency. The differences Δf in the frequencies is used to determine the acceleration force applied to the proof mass 14, as explained below.

Figure 5:
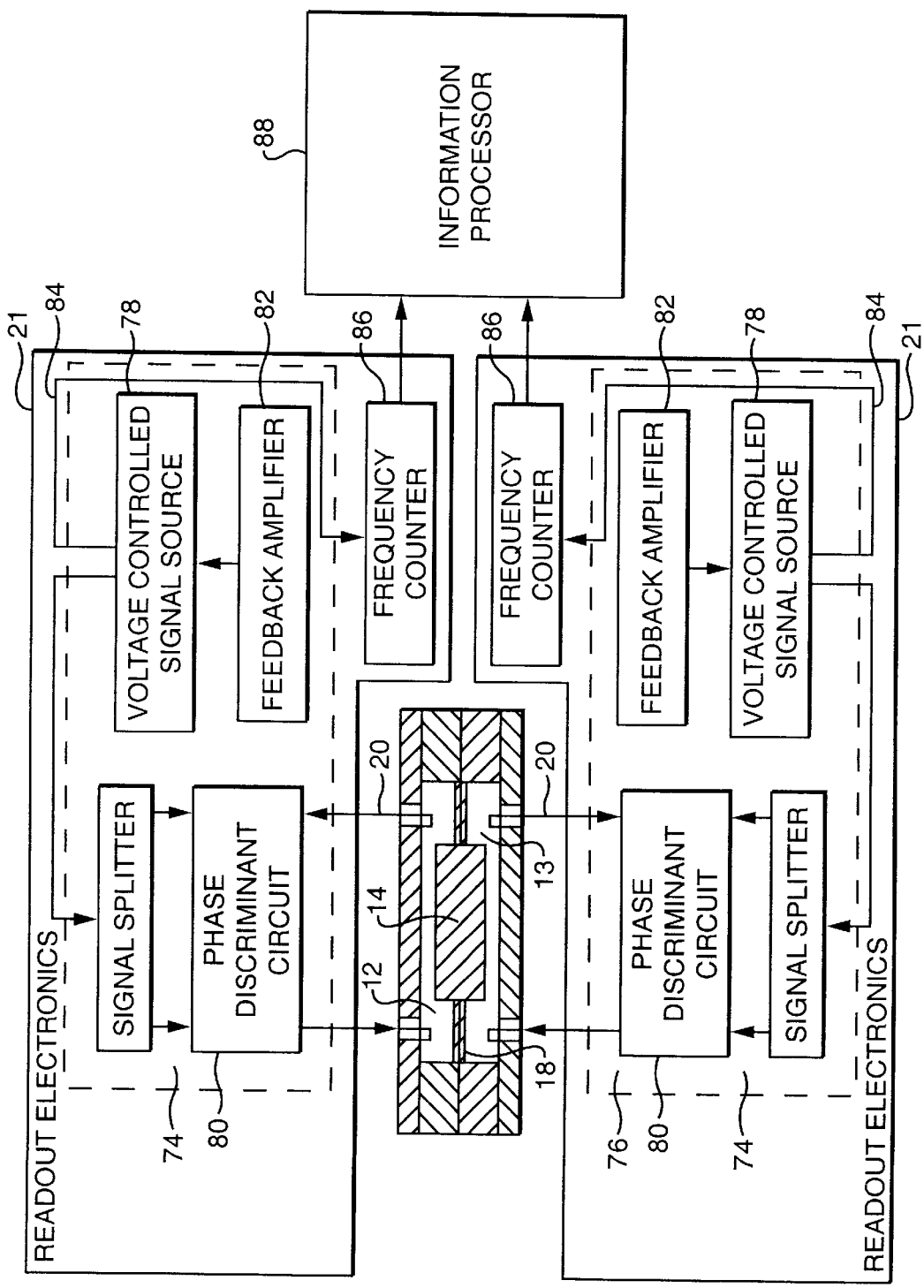
FIG. 5 is a block diagram of one embodiment of a readout electronic circuit for a reentrant cavity accelerometer constructed according to the present invention.

FIG. 5 is a block diagram of one embodiment of a means for detecting electromagnetic energy in each cavity and determining the frequency of the detected energy. In the embodiment illustrated in FIG. 5, the means for detecting electromagnetic energy includes a readout electronic circuit 21. The readout electronic circuit 21 includes a frequency discrimination circuit 74, which discriminates the frequency shift between the initial nominal resonant frequency and the new resonant frequency of each cavity. The frequency shift becomes a pick-off signal indicative of the displacement of the proof mass. The signal can be read open-loop, if no precision voltage reference is available, as in radiation-hardened applications. If a precision voltage reference is available, the pickoff signal can be used as an error signal to force-rebalance the proof mass.

The reentrant cavities 12 and 13 are coupled to the readout electronic circuits 21 through the couplers 20. (shown is FIG. 1, not shown is FIG. 5) The shapes and dimensions of the couplers 20 depend on the location of the couplers within the cavities, and the characteristics of the readout electronic circuit 21. The coupler configuration is designed to maximize the microwave signals passing into and out of the resonant cavities, while minimizing the effect of the couplers on the resonant characteristics of the cavities. In one embodiment, the couplers 20 are coaxial leads.

The readout electronic circuit 21 uses the fact that at cavity resonance, microwave signals passing through a cavity experience a rapid variation in phase and amplitude when the frequency varies. The readout electronic circuit 21 generates signals which represent the resonant frequency of each resonant cavity at any given moment in time, and which vary in frequency according to the displacement of the proof mass 14. In FIG. 5, the frequency discrimination circuit 74 is a phase locked loop circuit 74 which phase locks a signal source 78 to the resonant frequency of the sensor cavity, and uses the frequency output of the signal source 78 to represent the acceleration. Preferably, the signal source 78 is a voltage controlled signal source. The voltage controlled signal source 78 produces a microwave signal at a frequency close to the nominal resonant frequency of the resonant cavities. This signal is delivered to the couplers 20 and introduced into each cavity. The signal is reflected from the proof mass 14 in each cavity. The reflected signals from each cavity are directed to a phase discriminant circuit 80. The reflected signals that enter the phase discriminant circuit 80 differ in frequency from the input signal from the signal source 78, because of the changes in resonant frequencies of the cavities induced by the motion of the proof mass in response to an acceleration force.

The phase discriminant circuit 80 discriminates a phase shift between the input microwave signal and the reflected microwave signal. The phase shift is used to adjust the frequency output of the voltage controlled signal source 78. The frequency shift between the input signal and the reflected signal directly represents the acceleration force applied to the proof mass 14. The phase discriminant circuit 80 generates a phase discriminant base band phase shift indicator signal, which is proportional to the phase difference between the input microwave signal and the reflected microwave signal. The phase shift indicator signal is fed back through a feedback amplifier 82 to the voltage controlled signal source 78, thereby locking it into the new resonant frequency of the resonant cavities. By monitoring the change in frequency of the signal source 78 demanded upon feedback from the feedback amplifier 82, a frequency varying signal 84 representative of the acceleration of the proof mass is obtained. The signal 84 varies in frequency according to the displacement of the proof mass induced by the acceleration force.

The readout electronic circuit 21 of FIG. 5 may further include a digital interface circuit (not shown), which digitizes the frequency varying signals 84, transforming them into digital pulses which can be counted relative to a time reference. A frequency counter 86 counts the digitized signals relative to a time reference, and generates output digital signals representing the acceleration of the proof mass 14. The output digital signals can be stored and processed as digital records, which are then sent to an information processor 88 through a data bus or microprocessor bus. Typically, the information processor 88 is a microprocessor or programmed logic module that transfers measurements to display or storage.

Figure 6:
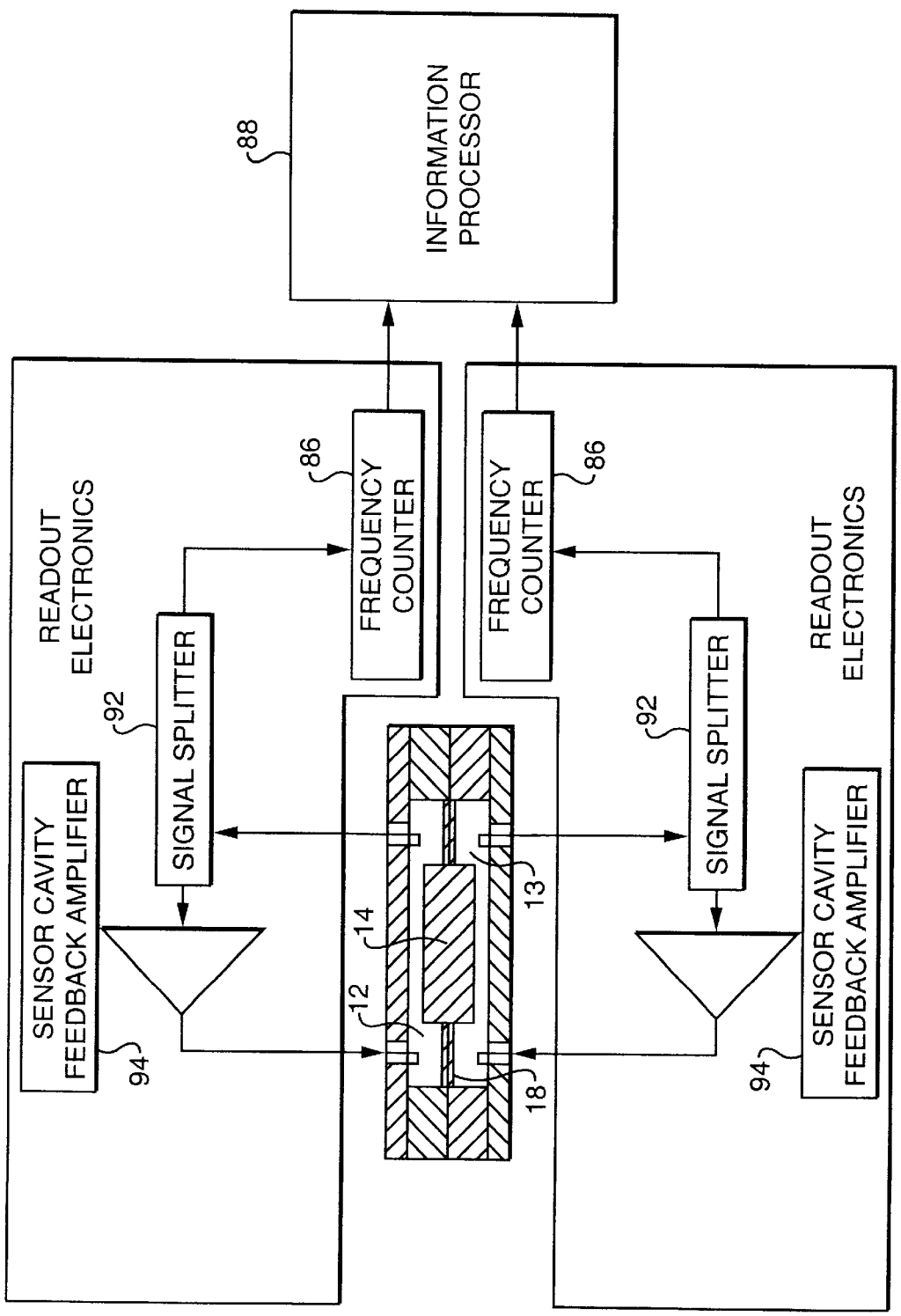
FIG. 6 is a block diagram of another embodiment of a readout electronic circuit for a reentrant cavity accelerometer constructed according to the present invention.

FIG. 6 is a block diagram of another embodiment of a readout electronic circuit 21. In this embodiment, the resonant cavities are coupled directly to a feedback amplifier 94, so as to form. an oscillator circuit. The reflected signals from the cavities are directed to the signal splitter 92. The output signal from the signal splitter 92 is fed back into the cavity through the feedback amplifier 94. When the phase shift and gain through a resonant cavity reaches a magnitude appropriate for sustaining oscillation, oscillation occurs. The signal splitter 92 sends a variable frequency counting signal, which represents the cavity resonant frequencies at any given moment and thus represent the acceleration of the proof mass 14, to a frequency counter 86. The frequency counter 86 renders a digital signal representing the acceleration of the proof mass 14 to an information processor 88 through a data bus or microprocessor bus.

In addition to a significantly improved sensitivity to proof mass displacement, another major advantage of using reentrant resonant cavities is that the size of the accelerometer can be reduced, allowing micromachining techniques to be applied. As mentioned in the background, simple cylindrical cavities typically have a size of the order of about one half the wavelength of the microwave signal at the frequency of operation. Since the wavelength is inversely proportional to the frequency, if one attempts to fabricated miniaturized version of an accelerometer having simple cylindrical cavities, the resulting resonant frequency becomes too high to be practically implementable. Resonant frequencies above around 40 GHz are applied with considerable expense and complexity.

Reentrant resonant cavities offer lower operating frequencies for a given size, as compared to simple cylindrical cavities, because of the presence of the narrow capacitive gaps 36. In a reentrant resonant cavity, the narrow gap 36 acts as a lumped capacitor, while the annular wide gap 38 acts as an inductor. The reentrant cavity thus performs as a resonance circuit having equivalent circuit components L (inductance) and C (capacitance). The capacitance C is inversely proportional to the height of the narrow gap. The annular wide gap 38 may be considered a lumped inductance L of value:

$$L = \left(\frac{\mu h}{2\pi}\right) \ln\left(\frac{r_2}{r_1}\right) \quad (2)$$

where
 $\mu$=magnetic permeability;
 h=height of the cavity
 $r_1$=radius of inner conductor
 $r_2$=radius of outer conductor An approximate representation (ignoring resistive losses) of the resonant frequency of the reentrant cavity is given by:

$$v = \left(\frac{1}{2\pi}\right)\frac{1}{\sqrt{LC}} \quad (3)$$

where C is the capacitive loading within the parallel surfaces of the narrow gap 36, and where the approximation has been made that all of the capacitance that determines the resonant frequency of the reentrant cavity comes from the capacitance of the narrow gap. C must thus be large enough in order for the resonant frequency of the cavity to be lowered. In reentrant cavities, the narrow capacitive gaps, which have small heights and correspondingly large capacitances, lower the resonant frequency of the cavities.

Because the resonant frequency of the accelerometer 10 is reduced for a given size of the accelerometer, lower cost electronics may be used. For example, a CMOS or-silicon bipolar amplifier can be used at a frequency of 1–5 GHz for the accelerometer 10 of the present invention, whereas prior art resonant cavity accelerometers may need to use a GaAs amplifier at a frequency of about 18 GHz.

FIG. 7 presents a table of typical device characteristics for one embodiment of a micromachined accelerometer constructed according to the present invention. In this embodiment, the miniaturized proof mass 14 has a mass of 0.183 g, according to the table in FIG. 7. As seen in FIG. 7, a resolution of the accelerometer of the present invention is about $1.1 \times 10^{-7}$ g, in 1 Hz bandwidth. The sensitivity of the accelerometer, as represented by the inverse of the scale factor, is about $1.1 \times 10^{-7}$ g/Hz. This represents an improvement in sensitivity by a factor of about 100 over the prior art, for miniaturized proof masses.

FIG. 7 shows that a cavity resonant frequency of about 2.8 GHz can be obtained, with a cavity capacitance C of about $2.3 \times 10^{-7}$ Farads and a cavity inductance L of about 1.39 $10^{-10}$ Henrys. The resonant frequency is thus reduced by a factor of about five to ten, compared to prior art microwave resonant cavity accelerometers which typically have resonant frequencies in the range of about 10–20 GHz. The size of the resonant cavity can thus be reduced correspondingly. As shown in FIG. 7, examples of values for the cavity dimensions at a resonant frequency of 2.8 GHz for the cavity may be 5.00E-03 meters for the inner radius of the cavity, 1.00E-02 meters for the outer radius of the cavity, and 1.00E-03 meters for the length of the cavity.

The accelerometer of the present invention can thus be fabricated with a micromachining process, using silicon micromachining and wafer bonding techniques known in the semiconductor industry. Silicon micromachining techniques can be used to shape silicon substrates, and to pattern thin films of materials such as oxides and metals deposited on the substrates. Suitable etching techniques, including wet or dry etching, can be used. Wafer bonding techniques such as direct silicon bonding or high temperature silicon-to-glass bonding are utilized to bond together the wafers and the various components of the accelerometer.

Micromachined accelerometers offer many advantages over conventionally machined accelerometers. A first advantage is cost effectiveness and competitiveness. Micromachining processes benefit from economies of scale, so that micromachined versions of the accelerometer 10 could be mass produced with significantly lower cost, as compared to-conventionally machined accelerometers. Batch fabrication methods permit the manufacturing of many individual accelerometers on a single wafer assembly at one time, greatly reducing the labor and cost of these devices.

A second advantage is that the effects of thermal gradients are minimized by shrinking the size of the accelerometer 10. The smaller size of the. accelerometer makes it easier to keep the accelerometer isothermal, since offsets and bias sensitivity to thermal gradients are reduced. Also, one of the benefits of fabricating the accelerometer on a silicon substrate. is derived from the high thermal conductivity of silicon, which makes isothermal construction of the accelerator 10 possible in a micromachining process. Conventionally machined accelerometers are typically made of glasses such as silica or modified silica. While silicon has a much higher thermal coefficient of expansion than quartz or silica, it has a much larger thermal conductivity. Thus the temperature gradient across a silicon device is smaller than the temperature gradient across-a comparable device made of silica.

Finally, stability and drift performance of the accelerometer can be significantly improved by using micromachining processes. Currently, a major source of error for conventionally machined microwave resonant accelerometers is long term creep and plastic deformation occurring in the bonds between the proof mass, the flexible elements, and the resonant cavities. Typically, polymer adhesives or metallic bonds are used for bonding the components in a conventional machining process. As time passes, such bonds are subject to creep, plastic deformation, and hysteresis. Unlike polymer adhesives or metallic bonds, high temperature silicon-to-silicon or silicon-to-glass bonds used in semiconductor wafer-bonding processes are not subject to plastic deformation or long term creep, so that no plastic creep is introduced in the interfaces between the components. Drift and bias error are therefore minimized, and good stability and drift performance is attained. An all silicon device may be superior in this respect to a silicon and glass device, since glass can deform if it is raised near the glass transition temperature.

Figure 8:
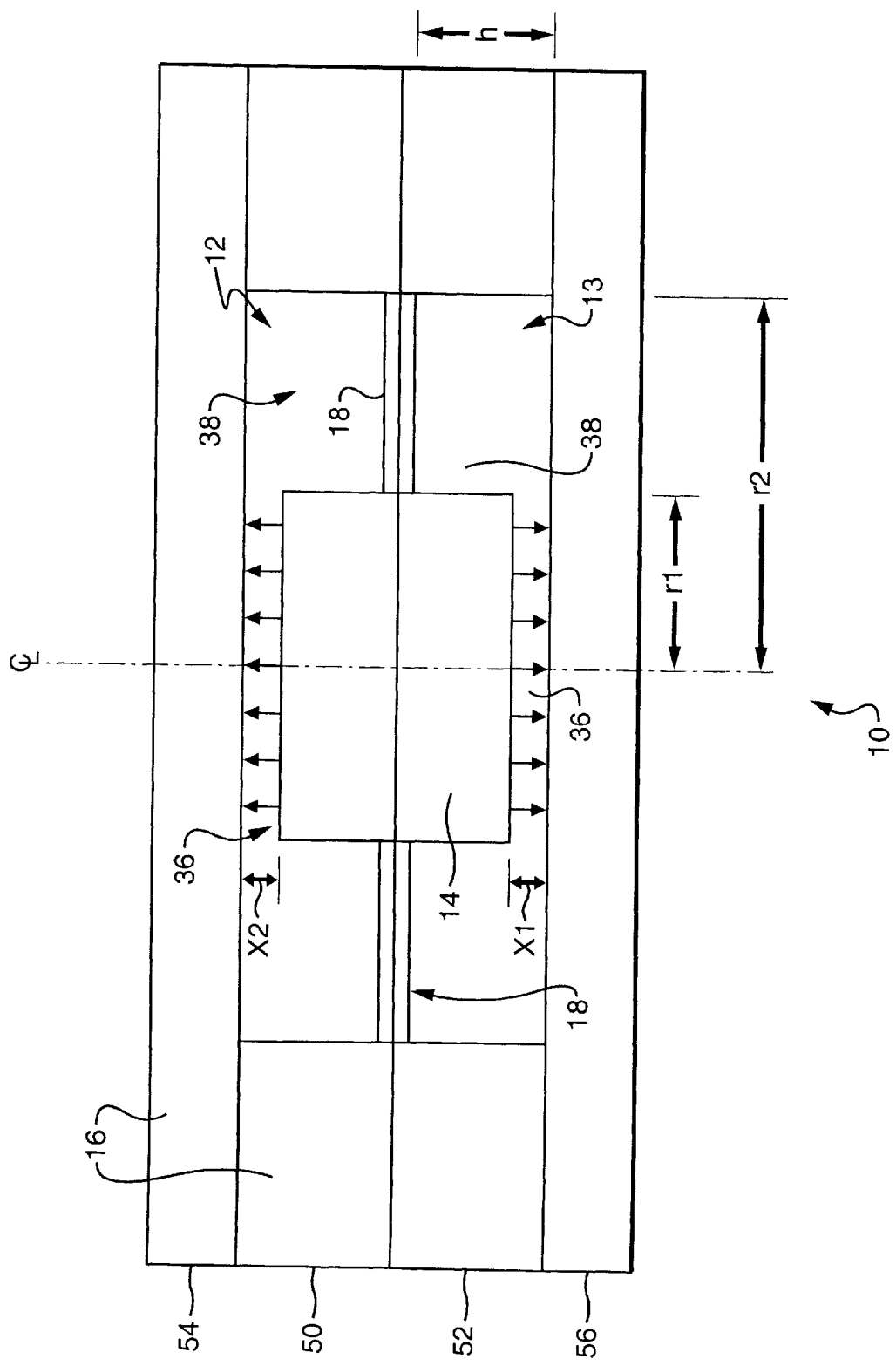
FIG. 8 is a cross-sectional view of a micromachined dual-cavity accelerometer.

FIG. 8 is a cross-sectional view of a micromachined version of a dual-cavity reentrant resonant cavity accelerometer. The proof mass 14 and the flexible member 18 are etched from the central wafers 50 and 52, which form part of the cavity housing 16. The miniaturized proof mass 14 typically has a surface area less than about 1 $cm^2$. Cap wafers 54 and 56 are bonded to the central wafers 50 and 52 using high temperature wafer bonding techniques, to complete the cavity housing 16. The narrow space between the proof mass 14 and the cap wafers 54 and 56 define the capacitive narrow gaps 36 for the first 12 and second 13 reentrant resonant cavities. Preferably,. the heights $x_1$ and $x_2$ of the capacitive narrow gaps are much smaller than the height h of the first and second cavities. The space between the inner ($r_1$) and outer ($r_2$) radii of the first and second resonant cavities define the inductive wide gaps 38.

The accelerometer 10 illustrated in FIG. 8 has an out-of-plane micromachined structure, in which the displacement vector of the proof mass is perpendicular to a broad planar surface of the wafers, i.e. parallel to the E-field lines shown in. FIG. 8. As the proof mass 14 moves out of plane, in response to an acceleration force, the heights $x_1$ and $x_2$ are complementarily changed, one becoming. larger and one becoming smaller.

Figure 9:
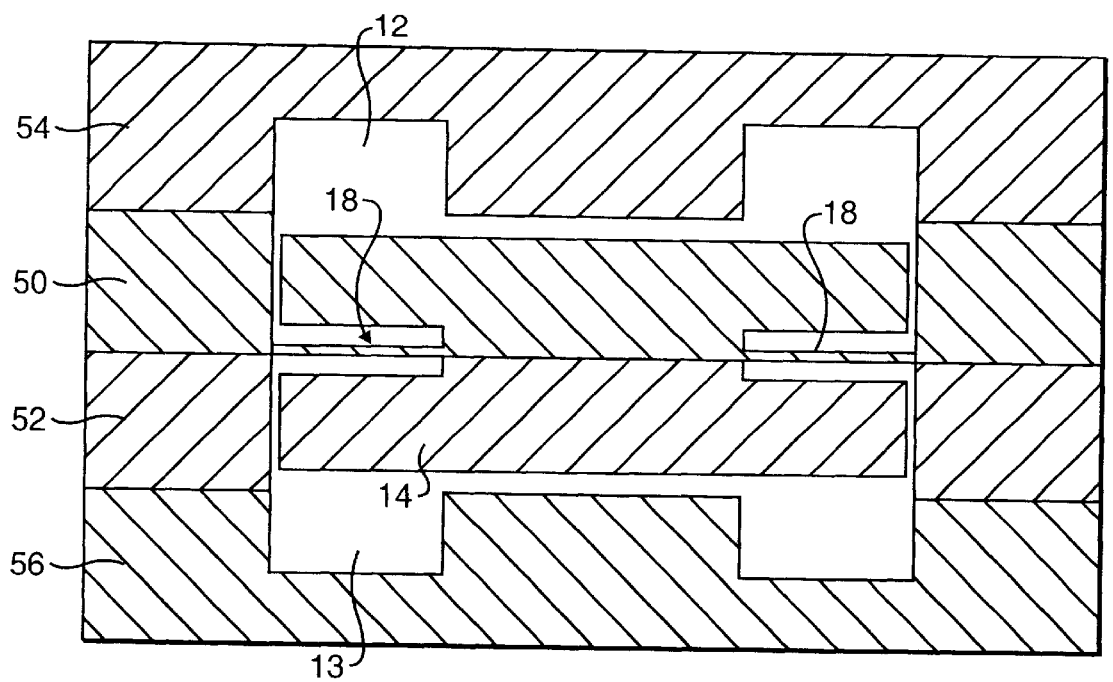
FIG. 9 is a cross-sectional view of a micromachined accelerometer that has flexible elements that are shielded from electromagnetic fields.

FIG. 9 illustrates one embodiment of a micromachined accelerometer of the present invention, in which no electromagnetic field is present at the flexible elements 18. The surfaces of the inner walls 26 of the cavity housing, as well as the outer surface 31 of the proof mass 14,.are entirely coated with a high conductivity metal. Preferably, the high conductivity metal is silver or copper, .with a little amount of gold to prevent corrosion. Because the outer surface 31 of the proof mass 14 acts as a reflecting surface for microwave energy coupled into the cavity, the outer surface 31 must be coated with metal. The flexible element 18 supporting the proof mass 14, however, must have zero plasticity. Because the metals that coat the surface 31 of the proof mass and the inner walls 26 exhibit plastic deformation, these metals are preferably not present on the flexible element 18. The flexible element 18 must consequently be shielded from the electromagnetic fields. In FIG. 9, the flexible element 18 is cut from one of the central proof mass wafers 50 or 52, before bonding, and is thereby shielded from the electromagnetic fields.

Figure 10A:
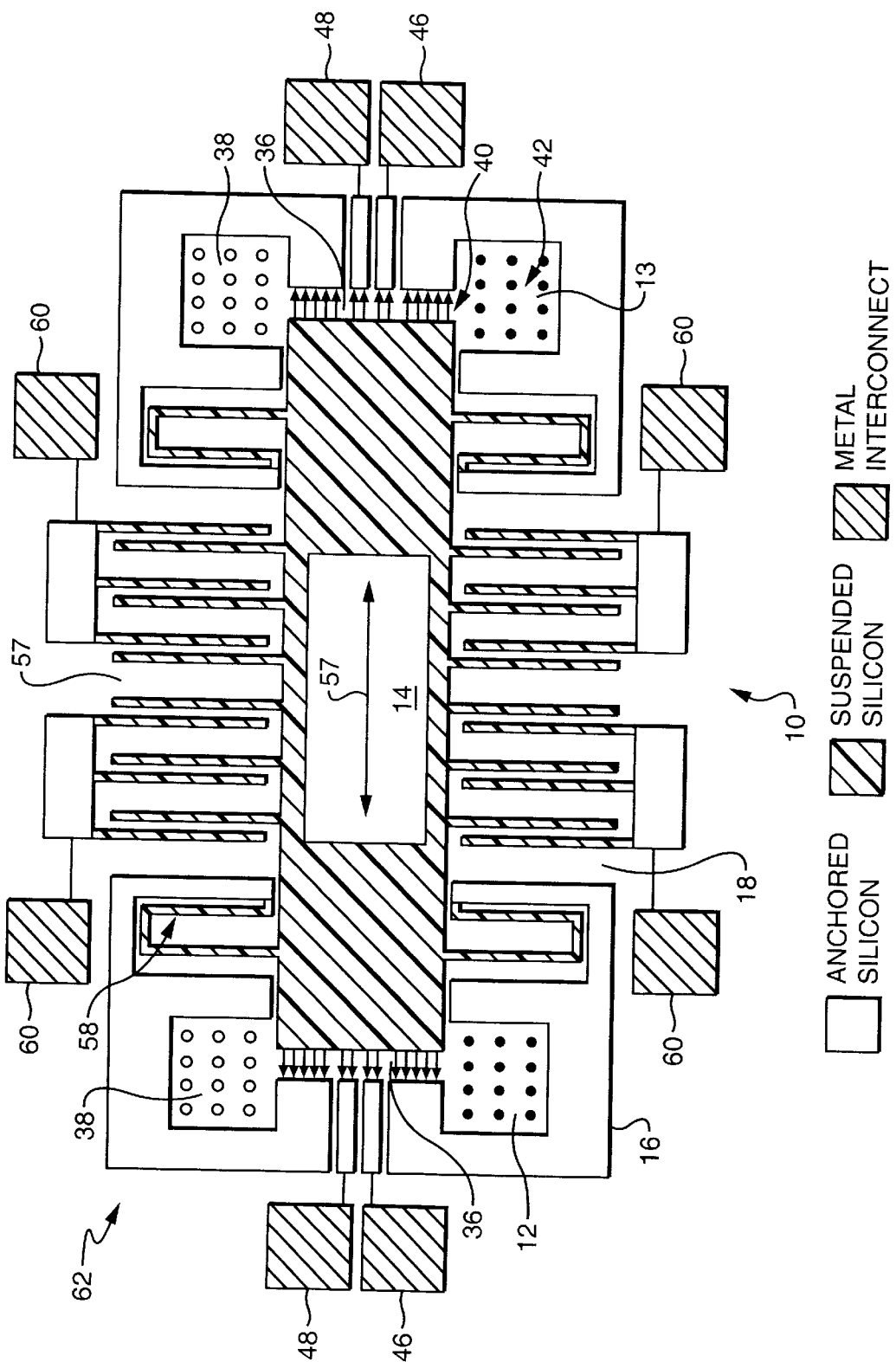
FIG. 10(a) illustrates a micromachined reentrant microwave resonant cavity accelerometer having an in-plane monolithic structure.

FIG. 10(a) illustrates one embodiment of a micromachined reentrant cavity accelerometer in which the accelerometer has an in-plane monolithic structure. Because of the monolithic structure, all constituent components of the accelerometer 10 in FIG. 10(a), including proof mass 14, springs 58, rebalance electrodes 60, drive electrodes, 46, and sense electrodes 48, are etched from a single central substrate 62. Unlike the accelerometer shown in FIG. 8, which has an out-of-plane structure so that the motion of the proof mass 14 is transverse to the planar surface of the substrate, the proof mass 14 in FIG. 10(a) moves in the plane of the planar surface of the silicon substrate. The proof mass may move. in either direction as indicated by the arrows 57, thereby changing the heights of the capacitive gap regions 36.

Figure 10B:
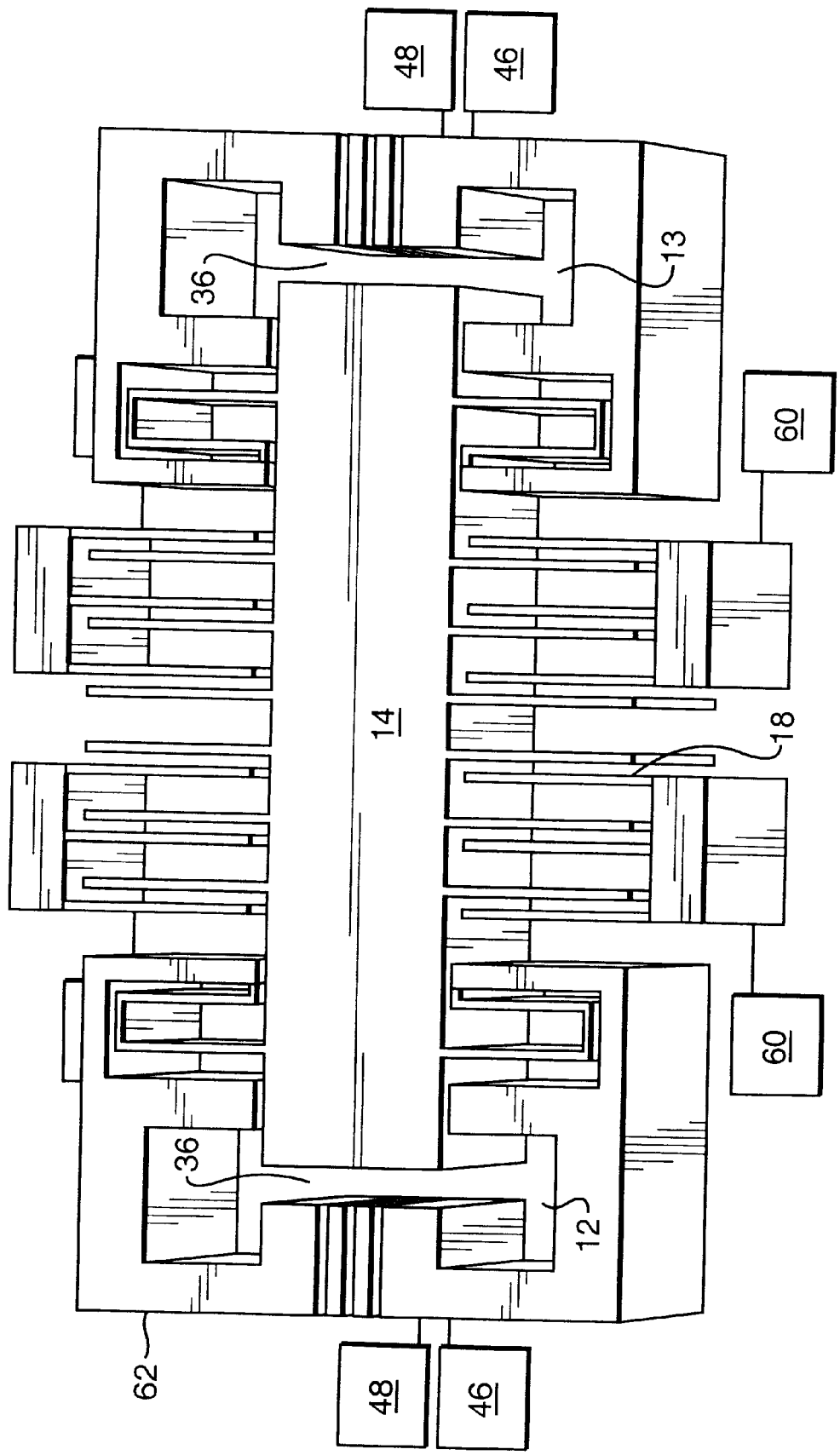
FIG. 10(b) is a perspective view of a proof-mass assembly, springs, and electrodes etched on a single substrate.

FIG. 10(b) shows a perspective view of the proof mass assembly etched. from the central wafer 62. The electrodes are metallic electrodes formed from metal interconnects that are deposited on the substrate. The proof mass 14 is fabricated as a suspended silicon'structure. Preferably, a wet etching step is used to release a portion of a substrate material from the substrate and to create a suspended structure having a void between the released portion and the substrate. The top and bottom surfaces of the proof mass 14 are suspended to be substantially parallel to the planar surface. of the substrate. At both ends of the proof mass 14 are etched the capacitive narrow gaps 36 of the resonant cavities.

Figure 10C:
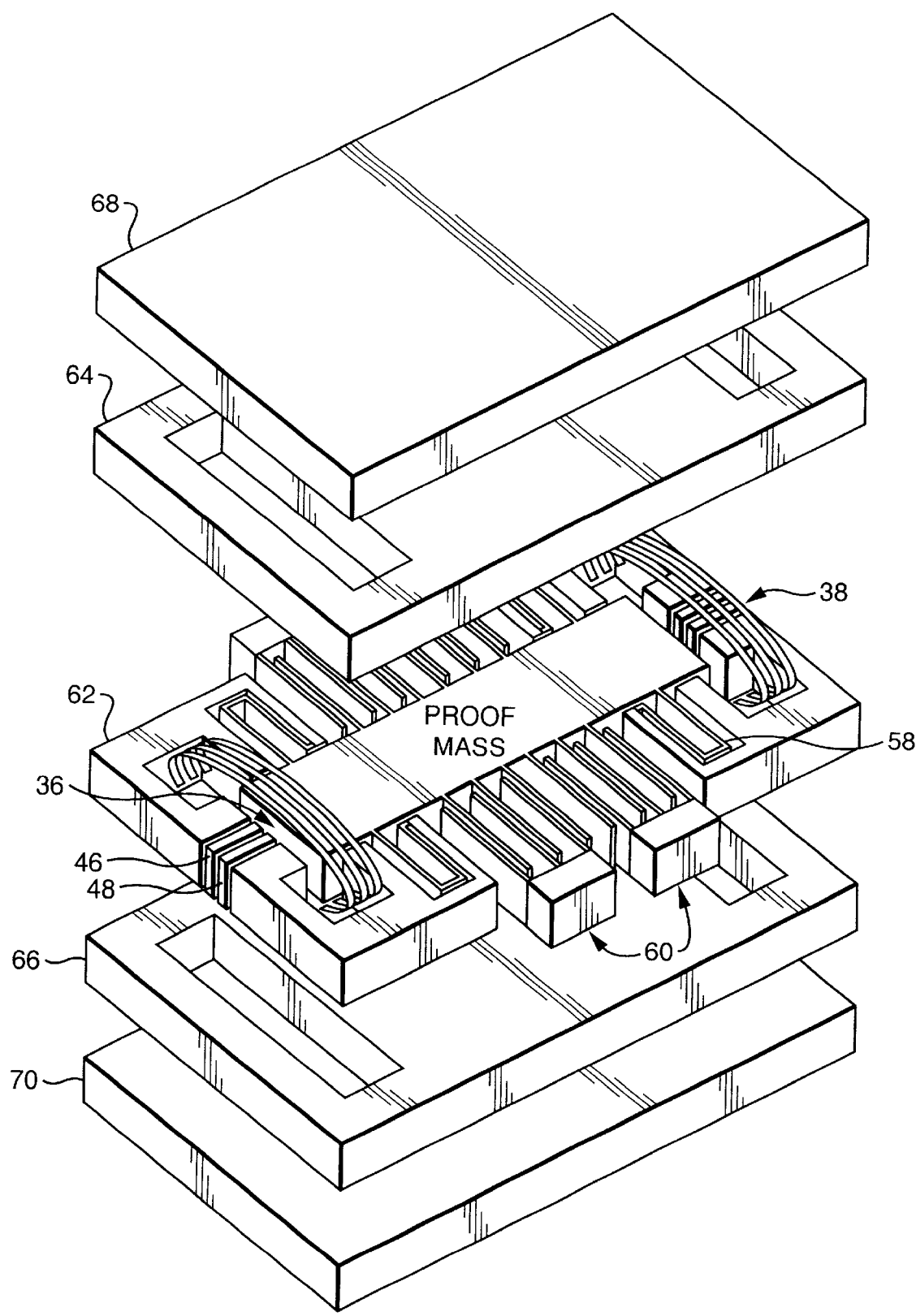
FIG. 10(c) is an exploded view of a 5-wafer stack accelerometer having an in-plane structure.

FIG. 10(c) is an exploded view showing all the wafers of a 5-wafer stack used to fabricate a micromachined accelerometer having an in-plane structure. An inductive loop 38 is etched from wafers 62, 64, and 66, and circles each capacitive narrow gap 36. Cap wafers 68 and 70 are bonded to the wafers 64 and 66, completing the accelerometer. The wafers are bonded together using wafer bonding techniques known in the art, including but not limited to eutectic metal bonding, silicon fusion bonding, or bonding using glass-frit.

The in-plane structure shown in FIGS. 10(a)–10(c) offers several advantages over an out-of-plane structure, as shown in FIG. 8. The in-plane structure allows for built-in damping and rebalance electrodes to be disposed far from the resonant cavities. Also, the in-plane structure allows for independent variation of parameters such as mass of the proof mass, spring-constant, rebalance electrodes, and microwave cavity size. The in-plane structure thus allows for a simpler fabrication process, compared to the out-of-plane microwave accelerometer.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A microwave resonant cavity, comprising:
   a. an open ended, hollow, rigid body member disposed about a central void region and extending along a sensing axis from a first end to a second end, said body member including an electrically conductive inner wall in part bounding said void region;
   b. a rigid end member extending transverse to said sensing axis and from said body member across said void region at said first end, said end member including an electrically conductive rigid wall in part bounding said void region;
   c. a flexible end member extending transverse to said sensing axis and from said body member across said void region at said second end, said flexible end member including an electrically conductive flexible wall in part bounding said void region;
   d. a proof mass positioned along said sensing axis and supported by said flexible wall,
      (i) wherein said proof mass has an electrically conductive outer surface in part bounding said void region, and
      (ii) wherein said outer surface extends from said flexible wall toward the rigid wall, whereby a distal portion of said outer surface establishes a relatively narrow gap in the direction of said sensing axis and between said outer surface and said rigid wall, and
      (iii) wherein an annular region of said flexible wall between said proof mass and said body member establishes a relatively wide gap in the direction of said sensing axis between said annular region and said rigid wall,
   said void region forming a reentrant resonant cavity, said cavity being characterized by a resonant microwave frequency.

2. A microwave resonant cavity accelerometer, comprising:
   A. a microwave resonant cavity including:
      a. an open ended, hollow, rigid body member disposed about a central void region and extending along a sensing axis from a first end to a second end, said body member including an electrically conductive inner wall in part bounding said void region;
      b. a rigid end member extending transverse to said sensing axis and from said body member across said void region at said first end, said end member including an electrically conductive rigid wall in part bounding said void region;
      c. a flexible end member extending transverse to said sensing axis and from said body member across said void region at said second end, said flexible end member including an electrically conductive flexible wall in part bounding said void region;
      d. a proof mass positioned along said sensing axis and supported by said flexible wall,
         (i) wherein said proof mass has an electrically conductive outer surface in part bounding said void region, and (ii) wherein said outer surface extends from said flexible wall toward the rigid wall, whereby a distal portion of said outer surface establishes a relatively narrow gap in the direction of said sensing axis and between said outer surface and said rigid wall, and (iii) wherein an annular region of said flexible wall between said proof mass and said body member establishes a relatively wide gap in the direction of said sensing axis between said annular region and said rigid wall, and said void region forming said resonant cavity, said cavity being characterized by a nominal resonant microwave frequency, B. a coupler for coupling an electromagnetic signal into said cavity substantially at said resonant frequency, and C. means for detecting electromagnetic energy in said cavity and determining the frequency of said detected energy;

wherein a displacement of the proof mass along said sensing axis in response to an acceleration force changes dimensions of the cavity so as to establish a resonant frequency for the cavity which varies as a function of the acceleration force.

3. An accelerometer according to claim 2, wherein upon coupling of said electromagnetic signal into said cavity, electric field within the cavity is substantially concentrated within the relatively narrow gap, and magnetic field within the cavity is substantially concentrated within the relatively wide gap.

4. An accelerometer according to claim 2, wherein the means for detecting electromagnetic energy includes means, responsive to a reflected microwave signal from the cavity, for discriminating a frequency shift in the resonant frequency of the cavity.

5. An accelerometer according to claim 2, wherein the means for determining the frequency of said detected energy comprises a phase locked loop circuit.

6. An accelerometer according to claim 5, wherein the phase locked loop circuit comprises:

a signal source for generating an input microwave signal substantially at the nominal resonant frequency;

a phase discriminant circuit for discriminating a phase shift between the input microwave signal and a microwave signal reflected from the resonant cavity, the phase discriminant circuit generating an indicator signal representative of the phase shift; and a feedback circuit that feeds back the indicator signal to the signal source;

wherein upon feedback of the indicator signal, the signal source generates an output signal that varies in frequency according to the displacement of the proof mass resulting from the acceleration force.

7. An accelerometer according to claim 6, further comprising a frequency counter for counting a frequency of the output signal, and for generating digital signals representative of the acceleration of the proof mass.

8. An accelerometer according to claim 6, wherein the signal source is a voltage-controlled signal source whose frequency is adjusted upon feedback of the indicator signal.

9. An accelerometer according to claim 2, wherein the coupler comprises a coaxial lead.

10. An accelerometer comprising:

a. a reentrant microwave resonant cavity having a nominal resonant frequency, the reentrant cavity including a capacitive gap and an inductive gap;

b. a coupler for coupling to the cavity a microwave signal substantially at the resonant frequency;

c. a proof mass constructed and arranged so as to change dimensions of the reentrant cavity in response to an acceleration force on the proof mass and so as to establish a resonant frequency for the reentrant cavity which varies as a function of the acceleration force; and d. means for detecting electromagnetic energy in the cavity and determining the frequency of the detected energy.

11. An accelerometer, comprising:

A. first and second complementary microwave resonant cavities, the cavities comprising:

a. a hollow, rigid cavity housing enclosing a central void region, the cavity housing including a plurality of electrically conductive inner walls bounding the central void region;

b. a flexible, nominally planar member extending from an inner wall across the void region to an opposite inner wall; and c. a proof mass positioned along a sensing axis, the proof mass being disposed on and supported by the flexible member so that the proof mass and the flexible member divide the central void region into a first void region extending from a first side of said flexible member and a second void region extending from a second side of said flexible member, an outer surface of the proof mass in part bounding said first and second void regions;

wherein first and second portions of the outer surface of the proof mass establish capacitive gaps between each portion and an inner wall disposed adjacent to and across from said portion, the capacitive gaps being relatively narrow in a direction of said sensing axis; and wherein an annular inductive gap surrounds each said capacitive gap, said inductive gaps being relatively wide in a direction of said sensing axis;

said first and second void regions forming first and second complementary reentrant microwave resonant cavities, each said cavity being characterized by a nominal resonant microwave frequency;

B. a coupler for coupling to each said cavity a microwave signal substantially at the nominal resonant frequency of each said cavity; and C. means for detecting electromagnetic energy in each said cavity and determining the frequency of the detected energy;

wherein the proof mass differentially changes dimensions of and establishes a resonant frequency for each said resonant cavity which varies as a function of an acceleration force along the sensing axis.

12. An accelerometer according to claim 11, wherein the nominal resonant frequencies of the first and the second cavities are the same.

13. An accelerometer according to claim 11, wherein an inner radius of each said cavity is less than about 1.5 mm, and an outer radius of each said cavity is less than about 10 mm.

14. An accelerometer according to claim 11, wherein a resolution of the accelerometer, measuring an acceleration in g per frequency shift in Hz and representing a sensitivity of the accelerometer to the acceleration of the proof mass, is less than about $1.3 \times 10^{-7}$ g/Hz.

15. An accelerometer according to claim 11, characterized in that the accelerometer is fabricated using a micromachining technique.

16. An accelerometer according to claim 11, wherein the nominal resonant frequencies of the first and second cavities are less than about 3 GHz.

17. An accelerometer according to claim 15, wherein the accelerometer comprises a single substrate having a proof mass, a plurality of electrodes, and springs etched thereon, and wherein a displacement vector of the proof mass is parallel to a planar surface of the substrate.

18. An accelerometer according to claim 15, wherein the proof mass has a surface area less than about 1 cm$^2$.

19. A method for determining an acceleration, the method comprising:

providing a reentrant microwave resonant cavity having a capacitive gap and an inductive gap surrounding the capacitive gap, and having a nominal resonant frequency;

coupling a microwave signal into the reentrant resonant cavity substantially at the nominal resonant frequency;

inducing, in response to an acceleration force, a displacement of a proof mass along a sensing axis that changes dimensions of the reentrant resonant cavity;

establishing a resonant frequency of the reentrant resonant cavity which varies as a function of the acceleration force; and measuring a frequency shift in the resonant frequency of the resonant cavity to determine the acceleration of the proof mass.

* * * * *